United States Patent
Suzuki et al.

(10) Patent No.: US 10,177,819 B2
(45) Date of Patent: Jan. 8, 2019

(54) INFORMATION PROCESSING APPARATUS, IMAGE FORMING APPARATUS, AND NON-TRANSITORY COMPUTER READABLE MEDIUM FOR COMMUNICATION USING TWO DIFFERENT NEAR FIELD COMMUNICATION UNITS

(71) Applicant: FUJI XEROX CO., LTD., Tokyo (JP)

(72) Inventors: Tatsuro Suzuki, Yokohama (JP); Futoshi Ootaka, Yokohama (JP); Miyuki Yamada, Yokohama (JP); Misuzu Takahashi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 26 days.

(21) Appl. No.: 15/231,441

(22) Filed: Aug. 8, 2016

(65) Prior Publication Data
US 2017/0272126 A1 Sep. 21, 2017

(30) Foreign Application Priority Data
Mar. 18, 2016 (JP) .................................. 2016-055521

(51) Int. Cl.
*H04N 1/00* (2006.01)
*H04B 5/00* (2006.01)
*H04N 1/333* (2006.01)
*H04N 1/44* (2006.01)

(52) U.S. Cl.
CPC ....... *H04B 5/0075* (2013.01); *H04N 1/00307* (2013.01); *H04N 1/33338* (2013.01); *H04N 1/4426* (2013.01); *H04N 2201/006* (2013.01); *H04N 2201/0041* (2013.01); *H04N 2201/0094* (2013.01)

(58) Field of Classification Search
CPC .................. H04N 1/00307; H04N 1/4426
See application file for complete search history.

(56) References Cited

U.S. PATENT DOCUMENTS

2009/0036056 A1* 2/2009 Oshima ............... H04M 1/7253
455/41.3
2011/0292445 A1* 12/2011 Kato ..................... G06F 3/1222
358/1.15

(Continued)

FOREIGN PATENT DOCUMENTS

JP 2015-069458 A 4/2015

*Primary Examiner* — Benjamin O Dulaney
(74) *Attorney, Agent, or Firm* — Oliff PLC

(57) ABSTRACT

Provided is an information processing apparatus, including a first near field communication unit that transmits a first wireless signal for performing first near field communication with a first communication object, a second near field communication unit that transmits a second wireless signal for performing second near field communication with a second communication object that is capable of being the first communication object, and a communication controller that controls the first and second near field communication units to perform the first or second near field communication with the first or second communication object when the first wireless signal and the second wireless signal are alternately transmitted, and existence of the first or the second communication object is continuously detected plural times through transmission of one of the first and second wireless signals.

7 Claims, 2 Drawing Sheets

(56) References Cited

U.S. PATENT DOCUMENTS

| | | | | |
|---|---|---|---|---|
| 2012/0309309 A1* | 12/2012 | Cho | ............... | H04W 76/14 |
| | | | | 455/41.1 |
| 2013/0215467 A1* | 8/2013 | Fein | ............... | G06F 3/1204 |
| | | | | 358/1.15 |
| 2014/0144976 A1* | 5/2014 | Angus | ............ | G07D 7/0006 |
| | | | | 235/375 |
| 2014/0252083 A1* | 9/2014 | Lee | .............. | G06Q 30/0241 |
| | | | | 235/375 |
| 2014/0355057 A1* | 12/2014 | Jang | ............. | G06K 7/10297 |
| | | | | 358/1.15 |
| 2015/0092225 A1* | 4/2015 | Kaigawa | ......... | G06F 3/1238 |
| | | | | 358/1.14 |
| 2015/0111493 A1* | 4/2015 | Berkema | ......... | H04W 76/14 |
| | | | | 455/41.1 |
| 2017/0041400 A1* | 2/2017 | Asakura | .......... | H04W 4/80 |

\* cited by examiner

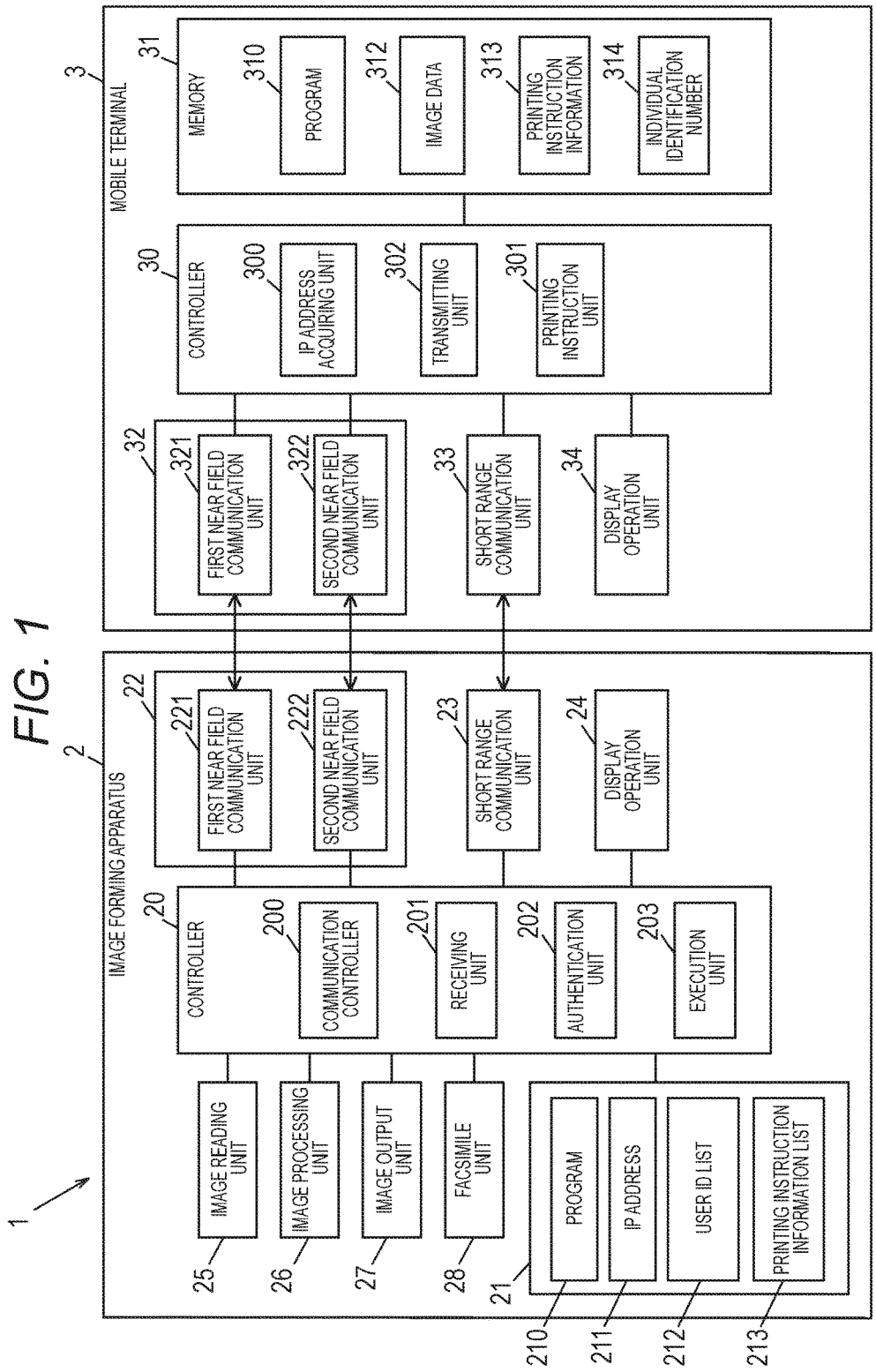

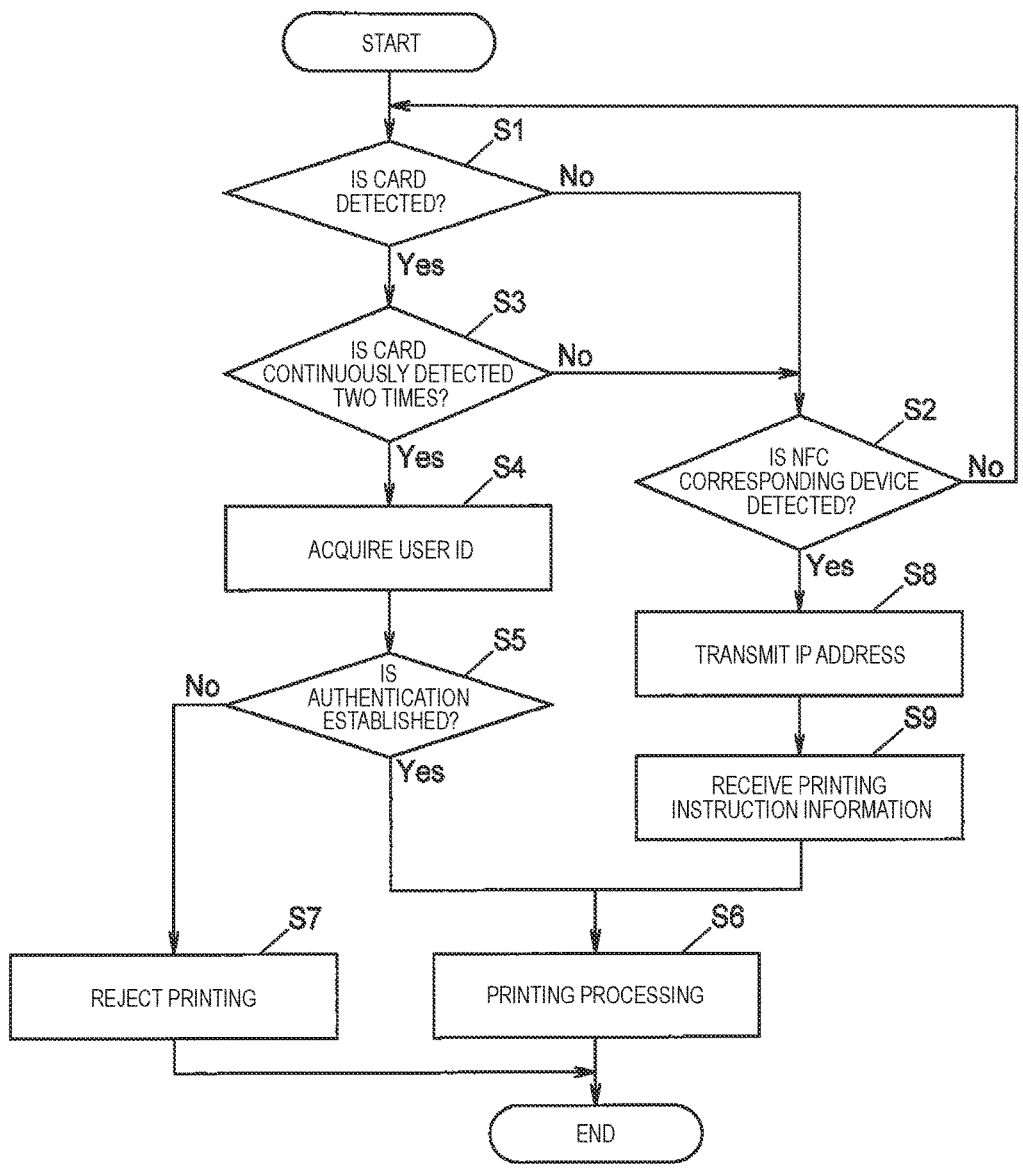

INFORMATION PROCESSING APPARATUS, IMAGE FORMING APPARATUS, AND NON-TRANSITORY COMPUTER READABLE MEDIUM FOR COMMUNICATION USING TWO DIFFERENT NEAR FIELD COMMUNICATION UNITS

CROSS-REFERENCE TO RELATED APPLICATIONS

This application is based on and claims priority under 35 USC 119 from Japanese Patent Application No. 2016-055521 filed Mar. 18, 2016.

BACKGROUND

Technical Field

The present invention relates to an information processing apparatus, an image forming apparatus, and a non-transitory computer readable medium storing an information processing program.

SUMMARY

According to an aspect of the invention, there is provided an information processing apparatus, including: a first near field communication unit that transmits a first wireless signal for performing first near field communication with a first communication object; a second near field communication unit that transmits a second wireless signal for performing second near field communication with a second communication object that is capable of being the first communication object; and a communication controller that controls the first and second near field communication units to perform the first or second near field communication with the first or second communication object when the first wireless signal and the second wireless signal are alternately transmitted, and existence of the first or the second communication object is continuously detected plural times through transmission of one of the first and second wireless signals.

BRIEF DESCRIPTION OF THE DRAWINGS

Exemplary embodiments of the present invention will be described in detail based on the following figures, wherein:

FIG. 1 is a functional block diagram illustrating a configuration example of an information processing system according to an exemplary embodiment of the invention; and FIG. 2 is a flowchart illustrating an example of an operation of an image forming apparatus.

DETAILED DESCRIPTION

Hereinafter, an exemplary embodiment of the invention will be described with reference to the accompanying drawings. Furthermore, in the drawings, the same reference numeral will be given to a constituent element having substantially the same function, and redundant description thereof will not be repeated. Furthermore, in this exemplary embodiment, as an example of an information processing apparatus, description will be given of an image processing apparatus as an example, but other information processing apparatuses are also possible.

FIG. 1 is a functional block diagram illustrating a configuration example of the information processing system according to the exemplary embodiment of the invention. In an information processing system 1, an image forming apparatus 2 and a mobile terminal 3 are connected to each other for wireless communication. The mobile terminal 3 is an example of a terminal device of a user or an NFC corresponding device.

Configuration of Image Forming Apparatus

For example, the image forming apparatus 2 is a multi-function machine having plural functions such as copying, scanning, printing, and facsimile, and includes a controller 20 that controls respective units of the image forming apparatus 2. A memory 21, a near field communication unit 22, a short range communication unit 23, a display operation unit 24, an image reading unit 25, an image processing unit 26, an image output unit 27, and a facsimile unit 28 are connected to the controller 20.

The near field communication unit 22 includes a first near field communication unit 221 that transmits a first wireless signal to establish first near field communication with a non-contact type IC card (not illustrated), and a second near field communication unit 222 that transmits a second wireless signal to establish second near field communication with the mobile terminal 3. The non-contact type IC card is an example of a first communication object. The mobile terminal 3 is an example of a second communication object that may be the first communication object, a communication device, and an NFC corresponding device.

The first near field communication unit 221 performs first near field communication, in which a communication-possible distance is, for example, 10 cm or less, with a first near field communication unit 321 of the mobile terminal 3. As this communication, for example, wireless communication, which can establish communication with a non-contact type IC card that is defined in the NFC forum, is used in this exemplary embodiment. Examples of the non-contact type IC card that is defined in the NFC forum include a Type A and a Type B which are defined by International Standard ISO/IEC 14443, FeliCa (registered trademark) that is defined by Japanese Industrial Standard JIS X6319-4, and the like. The first near field communication is executed in a reader and writer mode, and uses a communication protocol different from that of second near field communication.

The second near field communication unit 222 performs second near field communication, in which a communication-possible distance is, for example, approximately 10 cm or less, with a second near field communication unit 322 of the mobile terminal 3. As this communication, for example, NFC communication, in which a P2P mode is possible, is used in this exemplary embodiment. The second near field communication is executed in the P2P mode, and uses a communication protocol different from that of the first near field communication.

The memory 21 is realized by a read only memory (ROM), a random access memory (RAM), a hard disk, and the like, and stores a program 210, an IP address 211 that is allocated to the memory 21, a user ID list 212, a printing instruction information list 213, and the like. Here, the IP address 211 is an example of identification information of the image forming apparatus 2. A user ID capable of accessing the image forming apparatus 2 is registered in the user ID list 212 in advance. Here, the user ID is an example of user identification information. Furthermore, the memory 21 may not store the user ID list 212. In this case, for example, a server stores the user ID list 212, and the image forming apparatus 2 makes a user authentication request for the server through a network. The program 210 is an example of an information processing program.

In a case where the near field communication unit 22 and a near field communication unit 32 as a counterpart exist in a communication-possible distance (for example, a distance between antennas is approximately 10 cm or less), existence of a communication object as a counterpart is detected, and connection of the first or second near field communication is established. In addition, in a case where the near field communication unit 32 as a counterpart gets out from the communication-possible distance in a state in which the near field communication unit 22 and the near field communication unit 32 as a counterpart exist in the communication-possible distance and connection thereof is established, the connection of the first or second near field communication is cut out.

The short range communication unit 23 performs short range communication with a short range communication unit 33 of the mobile terminal 3 in a communication-possible distance, for example, approximately 100 m or less which is longer than the communication-possible distance in the near field communication unit 22. As this communication, for example, wireless local area network (LAN) such as wireless fidelity (Wi-Fi) that passes through a LAN router, or wireless communication such as Wi-Fi Direct and Bluetooth (registered trademark) which do not pass through the LAN router and the like can be used.

The display operation unit 24 includes a touch panel display in which a touch panel is disposed on a display unit such as a liquid crystal monitor in a superimposing manner. The display operation unit 24 displays an operation screen on the display unit and receives an operation for the touch panel from an operator.

For example, the image reading unit 25 is constituted by a scanner, and inputs image data after reading the image data from an original document. The image processing unit 26 performs image processing such as compression, contraction, expansion, and composition of image data that is input from the image reading unit 25 and the like. For example, the image output unit 27 includes an image holding member such as a photoconductor, and outputs an image by forming the image on a recording medium such as a sheet of paper. The facsimile unit 28 performs modulation and demodulation of data in accordance with a facsimile protocol such as G3 and G4, and performs facsimile communication through a telephone line.

The controller 20 is constituted by a central processing unit (CPU), an interface, and the like. The CPU operates in accordance with the program 210 that is stored in the memory 21 to function as a communication controller 200, a receiving unit 201, an authentication unit 202, an execution unit 203, and the like, and executes the reader and writer mode and the P2P mode.

When the first wireless signal and the second wireless signal are alternatively transmitted, and existence of the first communication object is continuously detected plural times (for example, two times or three times) through the transmission of the first wireless signal, the communication controller 200 acquires necessary information such as the user ID from the non-contact type IC card through the first near field communication. In addition, when detecting existence of the mobile terminal 3 through transmission of the second wireless signal, the communication controller 200 reads out the IP address 211 from the memory 21, and controls the first and second near field communication units 221 and 222 to transmit the IP address 211 to the mobile terminal 3 through the second near field communication. When continuously detecting existence of the first communication object plural times, necessary information is acquired from the non-contact type IC card, and priority is given to the second near field communication in comparison to the first near field communication. Hereinafter, this processing is referred to as "filter processing".

When the short range communication unit 23 establishes connection of the short range communication with the short range communication unit 33 of the mobile terminal 3, the receiving unit 201 receives printing instruction information 313, which gives an instruction for printing of image data, from the mobile terminal 3 through the short range communication unit 23. The receiving unit 201 transmits the printing instruction information 313, which is received, to the execution unit 203.

In a case where the communication controller 200 acquires the user ID from the non-contact type IC card, the authentication unit 202 performs authentication processing on the basis of the user ID that is acquired. Specifically, the authentication unit 202 determines whether or not the user ID is registered in the user ID list 212 of the memory 21, and informs the execution unit 203 of the authentication result. In a case where the user ID is directly input through operation with respect to the display operation unit 24, the authentication processing may be performed on the basis of the user ID that is directly input. Furthermore, the authentication unit 202 may authenticate a user on the basis of the user ID and a password.

The execution unit 203 executes printing processing in accordance with the printing instruction information 313 that is transmitted from the receiving unit 201. That is, the execution unit 203 controls the image output unit 27 to print image data under printing conditions which are set by the printing instruction information 313. The image output unit 27 prints the image data on a recording medium such as a sheet of paper under the printing conditions which are set by the printing instruction information 313. Furthermore, the execution unit 203 may execute processing by controlling the image processing unit 26 or the facsimile unit 28 in accordance with instruction information that is transmitted from the receiving unit 201.

In addition, in a case where authentication by the authentication unit 202 is established, the execution unit 203 performs the printing processing. In a case where the authentication is not established, the execution unit 203 rejects the printing processing.

Furthermore, a part or the entirety of the communication controller 200, the receiving unit 201, the authentication unit 202, and the execution unit 203 may be constituted by a hardware circuit such as a field programmable gate array (FPGA) and an application specific integrated circuit (ASIC).

Configuration of Mobile Terminal

The mobile terminal 3 includes the controller 30 that controls respective units of the mobile terminal 3, and the memory 31, the near field communication unit 32, the short range communication unit 33, and the display operation unit 34 are connected to the controller 30. The mobile terminal 3 may be a personal computer, a tablet type computer, a multi-function telephone (smart phone), a mobile phone, and the like.

The memory 31 is realized by a read only memory (ROM), a random access memory (RAM), a hard disk, and the like, and stores a program 310, image data 312, the printing instruction information 313, an individual identification number 314, and the like.

The near field communication unit 32 includes the first near field communication unit 321 that transmits a first wireless signal for performing first near field communication, and the second near field communication unit 322 that transmits a second wireless signal for performing second near field communication. The first near field communication unit 321 performs the first near field communication with the first near field communication unit 221 of the image forming apparatus 2, and has the same function as that of the first near field communication unit 221 of the image forming apparatus 2. The second near field communication unit 322 performs the second near field communication with the second near field communication unit 222 of the image forming apparatus 2, and has the same function as that of the second near field communication unit 222 of the image forming apparatus 2.

The short range communication unit 33 performs short range communication with the short range communication unit 23 of the image forming apparatus 2, and has the same function as that of the short range communication unit 23 of the image forming apparatus 2.

The display operation unit 34 includes a touch panel display in which a touch panel is disposed on a display unit such as a liquid crystal monitor in a superimposing manner. The display operation unit 34 displays an operation screen on the display unit and receives an operation for the touch panel from an operator.

The controller 30 is constituted by a central processing unit (CPU), an interface, and the like. The CPU operates in accordance with the program 310, which is stored in the memory 31, to function as an IP address acquiring unit 300, a printing instruction unit 301, a transmitting unit 302, and the like, and executes the CE mode and the P2P mode.

When the second near field communication unit 322 establishes connection of the second near field communication with the second near field communication unit 222 of the image forming apparatus 2, the IP address acquiring unit 300 acquires the IP address 211 of the image forming apparatus 2 through the second near field communication unit 322. The IP address acquiring unit 300 informs the printing instruction unit 301 of the IP address 211 that is acquired.

The printing instruction unit 301 transmits the printing instruction information 313, which instructs printing of the image data, to the image forming apparatus 2, which corresponds to the IP address 211, through the short range communication unit 33 in a state in which the IP address 211, which is acquired by the IP address acquiring unit 300, is set as a transmission destination.

When the first near field communication unit 221 establishes connection of the first near field communication with the first near field communication unit 321 of the mobile terminal 3, the transmitting unit 302 reads out the individual identification number 314 from the memory 31, and transmits the individual identification number 314 from the first near field communication unit 321 to the image forming apparatus 2.

Furthermore, a part or the entirety of the IP address acquiring unit 300, the printing instruction unit 301, and the transmitting unit 302 may be constituted by a hardware circuit such as FPGA and ASIC. In addition, the IP address acquiring unit 300 and the transmitting unit 302 may be executed by OS, and the printing instruction unit 301 may be executed by application software.

Operation of Information Processing System

Next, an example of the operation of the information processing system 1 will be described with reference to FIG. 2. FIG. 2 is a flowchart illustrating an example of the operation of the image forming apparatus 2.

(1) Printing by Using Non-Contact Type IC Card

First, a user operates a terminal device (not illustrated) to select image data that is an printing object, and sets printing conditions with respect to the image data, for example, color/monochrome, the number of printed sheets, and the like to generate printing instruction information. The user operates the terminal device to transmit the printing instruction information to the image forming apparatus 2 through a network.

When receiving the printing instruction information through the network, the receiving unit 201 of the image forming apparatus 2 stores the printing instruction information, which is received, in the printing instruction information list 213 of the memory 21.

Next, the user holds the non-contact type IC card (not illustrated) over the near field communication unit 22 of the image forming apparatus 2. The first near field communication unit 221 of the near field communication unit 22 detects existence of the non-contact type IC card (Yes in S1). When the first near field communication unit 221 continuously detects the existence of the non-contact type IC card two times (Yes in S3), the communication controller 200 acquires a user ID from the non-contact type IC card through the first near field communication unit 221 (S4). The user ID is an example of necessary information.

The authentication unit 202 determines whether or not the user ID, which is acquired by the communication controller 200, is registered in the user ID list 212 (S5). The authentication unit 202 informs the execution unit 203 of the authentication result.

In a case where authentication is established (Yes in S5), the execution unit 203 displays the printing instruction information list 213, which is stored in the memory 21, on the display operation unit 24. The user operates the display operation unit 24 to select printing instruction information that is desired to perform printing. The execution unit 203 controls the image output unit 27 in accordance with the printing instruction information, which is selected, to execute printing processing (S6).

In a case where authentication is not established (No in S5), the execution unit 203 rejects printing processing (S7).

(2) Printing by Using Mobile Terminal 3

The user operates the display operation unit 34 of the mobile terminal 3 to display a printing setting screen. Next, the user operates the printing setting screen to select the image data 312, which is a printing object, from the image data 312 that is stored in the memory 31.

Subsequently, the user sets printing conditions with respect to the image data 312 that is selected, for example, color/monochrome, the number of printed sheets, and the like. The printing instruction unit 301 generates the printing instruction information 313 for instruction of printing of the selected image data 312 under the printing conditions which are set, and stores the printing instruction information 313 in the memory 31. For example, the printing instruction unit 301 displays the selected image data on the display operation unit 34 so as to set the mobile terminal 3 to a stand-by state of near field communication and to allow the CE mode and the P2P mode to be executable. Furthermore, the method of setting the mobile terminal 3 to the stand-by state of near field communication is not limited to the method of displaying the selected image data on the display operation unit 34, and it is possible to employ an arbitrary state as long as the image data is selected and the printing conditions are set.

The first and second near field communication unit 221 and 222 of the image forming apparatus 2 periodically transmit the first or second wireless signal to determine whether or not a communication object exists. In a state in which the image data, which is selected by the user, is displayed on the display operation unit 34, if the near field communication unit 32 of the mobile terminal 3 is made to be close to (is held over) the near field communication unit 22 of the image forming apparatus 2, when detecting existence of the mobile terminal 3 as the NFC corresponding device, the first or second near field communication unit 221 or 222 of the near field communication unit 22 of the image forming apparatus 2 detects whether a first or second communication object exists between the first or second near field communication unit 221 or 222 and the first or second near field communication unit 321 or 322 of the near field communication unit 32 of the mobile terminal 3 (S1, S2). The order of detecting a communication object by the first near field communication and the second near field communication is different in accordance with timing.

In a case where the first near field communication unit 221 does not detect existence of the non-contact type IC card (No in S1), and the second near field communication unit 222 detects existence of the mobile terminal 3 (Yes in S2), the communication controller 200 of the image forming apparatus 2 reads out the IP address 211 from the memory 21, and transmits the IP address 211 to the mobile terminal 3 through the second near field communication unit 222 (S8). When acquiring the IP address 211 from the image forming apparatus 2, the IP address acquiring unit 300 of the mobile terminal 3 informs the printing instruction unit 301 of the IP address 211 that is acquired.

The printing instruction unit 301, which is informed of the IP address 211, performs control in order for the printing instruction information 313 to be transmitted from the short range communication unit 33 to the image forming apparatus 2 in a state in which the IP address 211 is set as a transmission destination. When the short range communication unit 33 establishes connection of the short range communication with the short range communication unit 23, the printing instruction information 313 is transmitted to the short range communication unit 23 of the image forming apparatus 2. The receiving unit 201 receives the printing instruction information 313 from the mobile terminal 3 through the short range communication unit 23 (S9).

The execution unit 203 controls the image output unit 27 to print the image data on a recording medium under the printing conditions which are set by the printing instruction information 313 (S6).

Hereinbefore, the exemplary embodiment of the invention has been described. However, the invention is not limited to the above-described exemplary embodiment, and various modifications and executions can be made in a range not changing the gist of the invention.

Modification Example 1

In the exemplary embodiment, so as to give a priority to the mobile terminal 3, in a case where existence of the non-contact type IC card is continuously detected plural times, control (filter processing) by the communication controller 200 for communication with the non-contact type IC card is employed. However, so as to give a priority to the non-contact type IC card, in a case where existence of the mobile terminal 3 is continuously detected plural times, communication with the mobile terminal 3 may be established.

Modification Example 2

The controller 20 of the image forming apparatus 2 may be provided with a setting unit configured to set the number of detection times of continuously detecting existence of one of the first and second communication objects by the communication controller 200 to one time through a setting operation.

Modification Example 3

The controller 20 of the image forming apparatus 2 may be provided with a selection unit configured to select a configuration in which communication is possible with both the first and second communication objects during holding-over of the communication objects, or a configuration in which communication is possible with only one of the first and second communication objects during holding-over of the communication objects. When the selection unit selects the configuration in which communication with both the first and second communication objects is possible, the filter processing may be set to be effective.

Modification Example 4

When the first near field communication unit 221 detects a non-contact type IC card of a kind that may cause confusion with the mobile terminal 3 among plural non-contact type IC cards, the controller 20 of the image forming apparatus 2 may set the filter processing to be effective.

Modification Example 5

In the above-described exemplary embodiment, the printing instruction information 313 is transmitted through the short range communication unit 33 for the reason that high-speed communication is possible, but the printing instruction information 313 may be transmitted through the near field communication unit 32 in a case where the amount of data is small, and the like.

In addition, in the flow of the exemplary embodiment, addition, deletion, change, substation of steps, and the like can be made in a range not changing the gist of the invention.

In addition, the program, which is used in the exemplary embodiment, may be provided in a state of being recorded on a computer-readable recording medium such a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
a near field communication unit including
a first near field communication unit that transmits, in a mode that is not a P2P mode, a first wireless signal for performing first near field communication with a non-contact type IC card as a first communication object; and
a second near field communication unit that transmits, in the P2P mode when the non-contact type IC card is not detected, a second wireless signal for performing second near field communication with a communication device as a second communication object that is capable of being the non-contact type IC card; and a communication controller that controls the first and second near field communication units to perform the first or second near field communication with the first or second communication object when the first wireless signal and the second wireless signal are alternately transmitted, and existence of the first or the second communication object is continuously detected a plurality of times through transmission of one of the first and second wireless signals.

2. The information processing apparatus according to claim 1, further comprising:
a setting unit that sets the number of detection times of continuously detecting existence of one of the first and second communication objects by the communication controller to one time through a setting operation.

3. The information processing apparatus according to claim 1, further comprising:
a selection unit that selects a configuration in which communication is possible with both the first and second communication objects during holding-over of the communication objects, or a configuration in which communication is possible with only one of the first and second communication objects during holding-over of the communication objects; and
a controller that sets the control of the communication controller to be effective when the configuration, in which communication is possible with both the first communication object and the second communication object, is selected by the selection unit.

4. An image forming apparatus, comprising:
a near field communication unit including
a first near field communication unit that transmits, in a mode that is not a P2P mode, a first wireless signal for performing first near field communication with a non-contact type IC card as a first communication object; and
a second near field communication unit that transmits, in the P2P mode when the non-contact type IC card is not detected, a second wireless signal for performing second near field communication with a communication device as a second communication object that is capable of being the non-contact type IC card; and
a communication controller that controls the first and second near field communication units to perform the first or second near field communication with the first or second communication object when the first wireless signal and the second wireless signal are alternately transmitted, and existence of the first or the second communication object is continuously detected a plurality of times through transmission of one of the first and second wireless signals.

5. The image forming apparatus according to claim 4, further comprising:
a setting unit that sets the number of detection times of continuously detecting existence of one of the first and second communication objects by the communication controller to one time through a setting operation.

6. The image forming apparatus according to claim 4, further comprising:
a selection unit that selects a configuration in which communication is possible with both the first and second communication objects during holding-over of the communication objects, or a configuration in which communication is possible with only one of the first and second communication objects during holding-over of the communication objects; and
a controller that sets the control of the communication controller to be effective when the configuration, in which communication is possible with both the first communication object and the second communication object, is selected by the selection unit.

7. A non-transitory computer readable medium storing an information processing program that allows a computer to function as:
a controller that controls a first near field communication unit that transmits, in a mode that is not a P2P mode, a first wireless signal for performing first near field communication with a non-contact type IC card as a first communication object, and a second near field communication unit that transmits, in the P2P mode, a second wireless signal for performing second near field communication with a second communication object that is capable of being the non-contact type IC card when the non-contact type IC card is not detected, and
wherein the controller includes a communication controller that controls the first and second near field communication units to perform the first or second near field communication with the first or second communication object when the first wireless signal and the second wireless signal are alternately transmitted, and existence of the first or the second communication object is continuously detected a plurality of times through transmission of one of the first and second wireless signals.

* * * * *